United States Patent
Kim et al.

(10) Patent No.: US 7,008,728 B2
(45) Date of Patent: Mar. 7, 2006

(54) NON-AQUEOUS ELECTROLYTE FOR LITHIUM SECONDARY BATTERY AND LITHIUM SECONDARY BATTERY COMPRISING SAME

(75) Inventors: Jin-Sung Kim, Cheonan (KR); Sang-Moon Hwang, Cheonan (KR); Ryuichi Shimizu, Yokohama (JP); Takitaro Yamaguchi, Yokohama (JP); Meen-Seon Paik, Cheonan (KR); Jin-Wook Lee, Ahsan (KR); Cheol-Soo Jung, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 254 days.

(21) Appl. No.: 10/119,868

(22) Filed: Apr. 9, 2002

(65) Prior Publication Data

US 2003/0068562 A1 Apr. 10, 2003

(30) Foreign Application Priority Data

Apr. 9, 2001 (JP) .............................. 2001-110350
May 10, 2001 (KR) ............................... 2001-25537

(51) Int. Cl.
*H01M 6/16* (2006.01)
(52) U.S. Cl. ...................... 429/330; 429/307; 429/314; 429/326; 429/332; 429/338; 429/339; 429/342; 429/231.1; 429/231.4; 429/231.8; 429/231.95; 29/623.1
(58) Field of Classification Search ................ 429/307, 429/314, 326, 330, 332, 338, 339, 342, 231.1, 429/231.4, 231.8, 231.95; 29/623.1
See application file for complete search history.

(56) References Cited

FOREIGN PATENT DOCUMENTS

| JP | 57-27241 | | 2/1982 |
|---|---|---|---|
| JP | 8-138649 | | 5/1996 |
| WO | WO 00/03449 | * | 1/2000 |

* cited by examiner

*Primary Examiner*—Laura Weiner

(74) *Attorney, Agent, or Firm*—Christie, Parker and Hale, LLP

(57) ABSTRACT

An electrolyte for a lithium secondary battery is provided. The electrolyte includes a lithium salt, a non-aqueous organic solvent, and a compound represented by Formula (1):

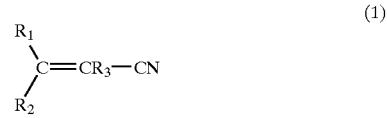

(1)

wherein $R_1$, $R_2$, and $R_3$ are each independently selected from the group consisting of hydrogen, primary, secondary, and tertiary alkyl groups, alkenyl groups, and aryl groups. The compound of the present invention is decomposed earlier than an electrolytic organic solvent, and an organic SEI film is formed on a negative electrode, thereby inhibiting the electrolytic organic solvent from decomposing.

11 Claims, 3 Drawing Sheets

NON-AQUEOUS ELECTROLYTE FOR LITHIUM SECONDARY BATTERY AND LITHIUM SECONDARY BATTERY COMPRISING SAME

CROSS REFERENCE TO RELATED APPLICATION

This application claims priority of Japanese Patent Application No. 2001-110350, filed in the Japanese Patent Office on Apr. 9, 2001, and Korean Patent Application No. 2001-25537, filed in the Korean Intellectual Property Office on May 10, 2001, the disclosures of which are incorporated herein by reference.

FIELD OF THE INVENTION

The present invention relates to a non-aqueous electrolyte for a lithium secondary battery and a lithium secondary battery comprising the same, and more particularly, to a non-aqueous electrolyte for a lithium secondary battery capable of preventing the thickness of the battery from expanding when the battery is charged at room temperature, or when the battery is stored at a high temperature after charging, and a lithium secondary battery comprising the same.

BACKGROUND OF THE INVENTION

The use of portable electronic instruments is increasing as electronic equipment gets smaller and lighter due to developments in high-tech electronic industries. Studies on lithium secondary batteries are actively being pursued in accordance with the increased need for a battery having high energy density for use as a power source in these portable electronic instruments. Materials that are capable of reversible intercalation/deintercalation of lithium ions such as lithium-transition metal oxides are used as a positive active material of a lithium secondary battery, and lithium metals, lithium-containing alloys, or materials that are capable of reversible intercalation/deintercalation of lithium ions such as crystalline or amorphous carbons, or carbon-containing composites are used as a negative active material of a lithium secondary battery.

The average discharge voltage of a lithium secondary battery is about 3.6 to 3.7V, which is higher than other alkali batteries, Ni—MH batteries, Ni-Cd batteries, etc. However, an electrolyte that is electrochemically stable in the charge and discharge voltage range of 0 to 4.2V is required in order to generate such a high driving voltage. As a result, a mixture of non-aqueous carbonate-based solvents, such as ethylene carbonate, dimethyl carbonate, diethyl carbonate, etc., is used as an electrolyte. However, such an electrolyte has significantly lower ion conductivity than an aqueous electrolyte that is used in a Ni—MH battery or a Ni-Cd battery, thereby resulting in the deterioration of battery characteristics during charging and discharging at a high rate.

During the initial charge of a lithium secondary battery, lithium ions, which are released from the lithium-transition metal oxide positive electrode of the battery, are transferred to a carbon negative electrode where the ions are intercalated into the carbon. Because of its high reactivity, lithium reacts with the carbon negative electrode to produce $Li_2CO_3$, LiO, LiOH, etc., thereby forming a thin film on the surface of the negative electrode. This film is referred to as an organic solid electrolyte interface (SEI) film. The organic SEI film formed during the initial charge not only prevents the reaction between lithium ions and the carbon negative electrode or other materials during charging and discharging, but it also acts as an ion tunnel, allowing the passage of only lithium ions. The ion tunnel prevents the disintegration of the structure of the carbon negative electrode, which causes organic solvents in an electrolyte with a high molecular weight to make solvate lithium ions, and the solvent and the solvated lithium ions co-intercalate into the carbon negative electrode.

Once the organic SEI film is formed, lithium ions do not again react with the carbon electrode or other materials such that an amount of lithium ions is maintained. That is, carbon of the negative electrode reacts with an electrolyte during the initial charging, thus forming a passivation layer such as an organic SEI film on the surface of the negative electrode such that the electrolyte solution no longer decomposes, and stable charging and discharging are maintained (*J. Power Sources*, 51 (1994), 79–104). Because of these reasons, in the lithium secondary battery, there is no irreversible formation reaction of the passivation layer, and a stable cycle life after the initial charging reaction is maintained.

In the case of a thin prismatic battery, a problem occurs in which gases are generated inside the battery due to a decomposition of a carbonate based organic solvent during the organic SEI film-forming reaction (*J. Power Sources*, 72(1998), 66–70). These gases include $H_2$, CO, $CO_2$, $CH_4$, $C_2H_6$, $C_3H_8$, $C_3H_6$, etc. depending on the type of non-aqueous organic solvent and negative active material used. The thickness of the battery increases during charging due to the generation of gas inside the battery, and a passivation layer is slowly disintegrated by electrochemical energy and heat energy, which increase with the passage of time when the battery is stored at high temperatures after it is charged. Accordingly, a side reaction in which an exposed surface of the negative electrode reacts with surrounding electrolyte occurs continuously. Furthermore, the internal pressure of the battery increases with this generation of gas. The increase in the internal pressure induces the deformation of the prismatic battery and lithium polymer battery. As a result, regional differences in the cohesion between pole plates inside an electrode element (positive and negative electrode, and separator) of the battery occur, thereby deteriorating the performance and safety of the battery and making it difficult to mount the lithium secondary battery set itself.

For solving the internal pressure problem, there is disclosed a method in which the safety of a secondary battery including a non-aqueous electrolyte is improved by mounting a vent or a current breaker for ejecting an internal electrolyte solution when the internal pressure is increased above a certain level. However, a problem with this method is that mis-operation may result from by an increase in internal pressure itself.

Furthermore, a method in which the SEI-forming reaction is changed by injecting additives into an electrolyte so as to inhibit the increase in internal pressure is known. For example, Japanese Patent Laid-open No. 97-73918 discloses a method in which high temperature storage characteristics of a battery are improved by adding 1% or less of a diphenyl picrylhydrazyl compound to the electrolyte. Japanese Patent Laid-open No. 96-321312 discloses a method in which cycle life and long-term storage characteristics are improved using 1 to 20% of an N-butyl amine group compound in an electrolyte. Japanese Patent Laid-open No. 96-64238 discloses a method in which storage characteristics of a battery are improved by adding $3 \times 10^{-4}$ to $3 \times 10^{-3}$ M of calcium salt to the electrolyte. Japanese Patent Laid-open No. 94-333596 discloses a method in which storage characteristics of a battery are improved by adding an azo compound to inhibit the reaction between an electrolyte and a negative electrode of the battery. In addition, Japanese Patent Laid-open No. 95-320779 discloses a method in which $CO_2$ is added to an electrolyte, and Japanese Patent Laid-open No. 95-320779 discloses a method in which sulfide-based compounds are added to an electrolyte in order to prevent the electrolyte from decomposing.

Such methods as described above for inducing the formation of an appropriate film on a negative electrode surface such as an organic SEI film by adding a small amount of organic or inorganic materials are used in order to improve the storage characteristics and safety of a battery. However, there are various problems with these methods: the added compound is decomposed or forms an unstable film by interacting with the carbon negative electrode during the initial charge and discharge due to inherent electrochemical characteristics, resulting in the deterioration of the ion mobility in an electron; and gas is generated inside the battery such that there is an increase in internal pressure, resulting in significant worsening of the storage characteristics, safety, cycle life characteristics, and capacity characteristics of the battery.

SUMMARY OF THE INVENTION

It is an object of the present invention to provide a non-aqueous electrolyte for a lithium secondary battery including an organic compound that is capable of inhibiting the generation of gas inside the battery caused by the decomposition of an electrolytic organic solvent during initial charging.

It is another object of the present invention to provide a lithium secondary battery that undergoes almost no variation in thickness when the battery is charged at room temperature, or when the battery is stored at a high temperature after charging.

In order to accomplish the objects of the present invention, the present invention provides an electrolyte for a lithium secondary battery. The electrolyte includes a lithium salt; a non-aqueous organic solvent; and a compound additive represented by the following Formula (1):

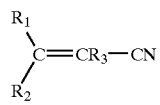
(1)

wherein $R_1$, $R_2$, and $R_3$ are each independently selected from the group consisting of hydrogen, primary, secondary, and tertiary alkyl groups, alkenyl groups, and aryl groups.

The present invention further provides a lithium secondary battery including the electrolyte; a positive electrode comprising a material that is capable of reversible intercalation/deintercalation of lithium ions as a positive active material; and a negative electrode comprising a material that is capable of reversible intercalation/deintercalation of lithium ions as a negative active material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
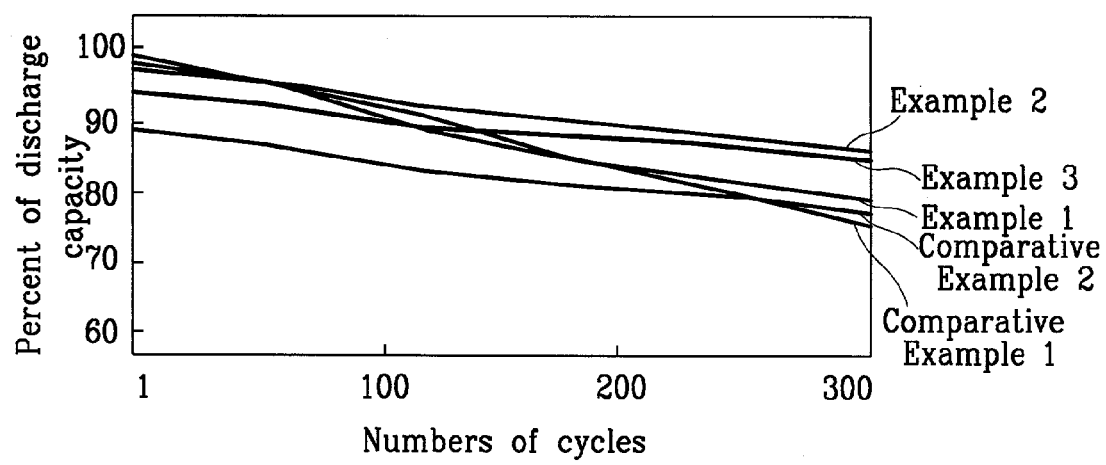
FIG. 1 is a graph illustrating cycle life characteristics of the battery cells including electrolytes according to Examples of the present invention, and Comparative Examples.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

According to the first preferred embodiment, an electrolyte of the present invention includes a lithium salt, a non-aqueous organic solvent, and a compound additive represented by the following Formula (1):

(1)

wherein $R_1$, $R_2$, and $R_3$ are each independently selected from the group consisting of hydrogen, primary, secondary, and tertiary alkyl groups, alkenyl groups, and aryl groups.

The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

The concentration of the lithium salt preferably ranges from 0.7 to 2.0M. When the concentration of the lithium salt is less than 0.7M, the electrolyte performance deteriorates due to its ionic conductivity. When the concentration of the lithium salt is greater than 2.0M, the lithium ion mobility decreases due to an increase of the electrolyte viscosity. The lithium salt acts in a battery as a supply source of lithium ions, making the basic operation of a lithium secondary battery possible.

The non-aqueous organic solvent may include a carbonate-based solvent such as a cyclic carbonate or a chain carbonate. Examples of cyclic carbonates include ethylene carbonate (EC), propylene carbonate (PC), and butylene carbonate (BC). Examples of chain carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), methylisopropyl carbonate, ethylbutyl carbonate, diisopropyl carbonate, and dibutyl carbonate.

In the present invention, the cyclic carbonate and the chain carbonate are preferably mixed together in a volume ratio of 1:1 to 1:9. When the cyclic carbonate and the chain carbonate are mixed in the volume ratio of 1:1 to 1:9, and the mixture is used as an electrolyte, the electrolyte performance may be enhanced.

In addition, the electrolyte of the present invention may further include mixtures of the carbonate-based solvents and aromatic hydrocarbon solvents. Examples of aromatic hydrocarbon solvents include benzene, chlorobenzene, nitrobenzene, fluorobenzene, toluene, trifluorotoluene, and xylene. The carbonate-based solvents and the aromatic hydrocarbon solvents are preferably mixed together in a volume ratio of 1:1 to 10:1. When a carbonate-based solvent and an aromatic hydrocarbon solvent are mixed with each other in the aforementioned volume ratio, and the mixture is used as an electrolyte, the electrolyte performance may be enhanced.

Preferably, the electrolyte of the present invention may further include an aprotic solvent selected from the group consisting of benzonitrile, acetonitrile, tetrahydrofuran, 2-methyltetrahydrofuran, γ-butyrolactone, dioxolane, 4-methyldioxolane, N,N-dimethylformide, dimethylacetamide, dimethylsulfoxide, dioxane, 1,2-dimethoxyethane, sulforane, dichloroethane, diethyleneglycol, dimethylether, and mixtures thereof.

The compound additive represented by the following Formula (1) is added to the non-aqueous organic solvent including the lithium salt, so that the electrolyte of the present invention is prepared:

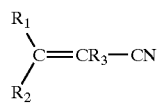

(1)

wherein $R_1$, $R_2$, and $R_3$ are each independently selected from the group consisting of hydrogen, primary, secondary, and tertiary alkyl groups, alkenyl groups, and aryl groups. $R_1$, $R_2$, and $R_3$ are preferably each selected from hydrogen, $C_1$ to $C_4$ alkyl groups, $C_2$ to $C_4$ alkenyl groups, and $C_6$ to $C_{14}$ aryl groups.

Exemplary compounds represented by Formula (1) preferably include acrylonitrile, methacrylonitrile, pentenenitrile, 2-ethylpentenenitrile, and 2-methylpentenenitrile.

The compound additive represented by Formula (1) is added in an amount of 0.1 to 1 wt %, based on the total amount of the electrolyte. The effect of inhibiting the generation of gas inside a battery is not likely when the compound is used in an amount of less than 0.1 wt %. Initial charge and discharge efficiencies and cycle life characteristics of the battery are decreased in accordance with the increase in the amount of compound used when the compound is used in an amount exceeding 1 wt %.

The compound additive is decomposed earlier than an electrolytic organic solvent during initial charging to react with lithium ions resulting in the formation of an organic SEI film, thereby inhibiting the decomposition of the electrolytic organic solvent. Therefore, the increase in the thickness of a prismatic battery or lithium polymer battery can be prevented during charging at room temperature or during high temperature storage after charging, since the generation of gas caused by the decomposition of the electrolytic organic solvent is inhibited during initial charging. In addition, the deterioration of charge and discharge capacity of the lithium secondary battery can be prevented, cycle life characteristics can be enhanced, and storage characteristics at high temperatures can be improved.

An electrolyte for a lithium secondary battery of the present invention is stable at a temperature ranging from −20 to 60° C., thereby maintaining stable characteristics of the battery even at a voltage of 4V. An electrolyte of the present invention can be applied to all lithium secondary batteries including a lithium ion battery, a lithium polymer battery, etc.

According to a second preferred embodiment, the present invention provides a lithium salt, a non-aqueous organic solvent, and an additive comprising a compound additive represented by the Formula (1) as above and an acrylate-based polymer.

The acrylate-based polymer preferably includes polyethyleneglycoldimethacrylate (PEGDMA) and polyethyleneglycoldiacrylate (PEGDA).

PEGDMA is a bifunctional acrylate ester derivative having two double bonds between carbon and carbon therein, which is represented by the following Formula (2):

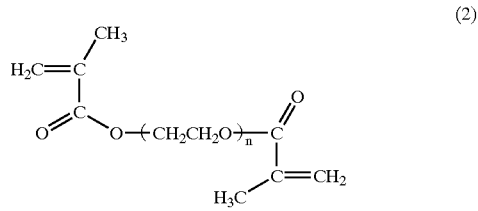

(2)

PEGDMA acts as a monomer capable of performing an anionic addition polymerization reaction and forms a polymer through radical polymerization upon heating. Additionally, it forms an organic SEI film on a negative electrode with relatively low potentials during charging. When the PEGDMA is anionic polymerized, the two double bonds are opened, and the PEGDMA is chain-reacted with the other PEGDMAs, thereby forming an organic SEI film including the PEGDMA polymer.

PEGDA is also a bifunctional acrylate ester derivative, which is represented by the Formula (3):

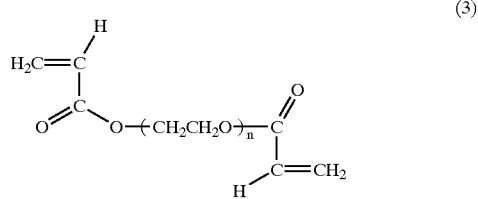

(3)

PEGDA acts as a monomer capable of performing an anionic addition polymerization reaction and forms a polymer through radical polymerization upon heating. In addition, it forms an organic SEI film on a negative electrode with relatively low potentials during charging.

The organic SEI film of the present invention is formed on the surface of a negative electrode with the compound additive represented by the Formula (1) or through anionic polymerization of the acrylate-based polymer represented by the Formulas (2) or (3). The organic SEI film formed by the compound of the Formula (1) or acrylate-based polymer added to an electrolyte has high ionic conductivity, and it is strong enough not to be electrolyzed at high applied voltages of greater than 4.2V.

The content of the acrylate-based polymer preferably ranges from 0.5 to 10 wt %, since it forms enough organic SEI film to prevent decomposition of organic solvent. When the content of the acrylate-based polymer is below 0.5 wt %, the organic SEI film may be insufficiently formed. When the content of the acrylate-based polymer is over 10 wt %, the internal impedance thereof may be increased due to an increase in thickness of the organic SEI film.

According to a third preferred embodiment, the present invention provides a lithium salt, a non-aqueous organic solvent, and an additive comprising the compound additive represented by Formula (1), an acrylate-based polymer, and acetonitrile (ACN).

The content of the acetonitrile preferably ranges from 0.1 to 5 wt %. When the content of the acetonitrile is below 0.1 wt %, the organic SEI film may have insufficient ionic conductivity of lithium. When the content of the acetonitrile is above 5 wt %, vapor pressure of an electrolyte may increase at high temperatures.

When the acetonitrile is further added to a non-aqueous electrolyte comprising a compound additive represented by the Formula (1), or a mixture of an additive of a compound represented by Formula (1) and an acrylate-based polymer, charge and discharge characteristics and characteristics of the battery at low temperatures can be enhanced because the acetonitrile is incorporated into the organic SEI film and thus improves ionic conductivity of lithium. It is assumed that the acetonitrile is co-polymerized with the compound represented by Formula (1) or with an acrylate-based polymer to be present in the organic SEI film, or that the acetonitrile is dissolved in the compound represented by Formula (1), or a copolymer of the compound represented by Formula (1) and an acrylate-based polymer to be present in the organic SEI film.

The thickness of the organic SEI film is as little as a few to tens of nm. When the thickness of the organic SEI film is more than tens of nm, the charge and discharge may occur inactively due to difficulties in lithium intercalation/deintercalation. When the thickness of the organic SEI film is below 1 nm, it may be difficult to maintain its shape.

The organic SEI film is formed on the surface of a negative electrode, and it prevents the electrode from contacting electrolyte directly. Therefore, the organic SEI film prohibits the decomposition reaction of the electrolyte, and gas generation and the modification of electrolyte are also prevented. The reduced gas generation prevents an increase of the internal pressure and swelling of the battery. In addition, since the electrolyte is prevented from being modified, the amount of the electrolyte does not decrease, and cycle life characteristics are enhanced resulting from effective charge and discharge reactions.

When a battery is stored at high temperatures for a long time, the cycle life characteristics and charge-discharge characteristics do not deteriorate since the reaction of an electrolyte and an electrode is prevented by the organic SEI film.

Because the organic SEI film has the high ionic conductivity of lithium, it is capable of transporting lithium ions between an electrolyte and a negative electrode. Therefore, when a surface of the negative electrode is covered with an organic SEI film, it does not prevent lithium ions from be transported between the electrolyte and the negative electrode, and it increases charge and discharge characteristics and cycle life characteristics. In addition, it helps the internal impedance to not increase, and also helps the charge and discharge capacity of a battery to not deteriorate significantly.

The electrolytes of the second embodiment and the third embodiment are polymer electrolytes where the acryl-based polymer is impregnated in an organic solvent. The electrolytes further comprise a high-swellable polymer such as polyethylene oxide (PEO), polypropylene oxide (PPO), polyacrylonitrile (PAN), polyvinylidene fluoride (PVDF), polymethylacrylate (PMA), or polymethylmethacrylate (PMMA).

A lithium secondary battery of the present invention is prepared by injecting the electrolyte of the present invention between a positive electrode and a negative electrode that comprise materials capable of intercalation/deintercalation of lithium ions as an active material.

The lithium secondary battery of the present invention uses a material that is capable of reversible intercalation/deintercalation of the lithium ions as positive and negative active materials. Examples of the positive active material include lithium transition metal oxides, such as $LiCoO_2$, $LiNiO_2$, $LiMnO_2$, $LiMn_2O_4$, $LiFeO_2$, $V_2O_5$, and $LiNi_{1-x-y}Co_xM_yO_2$ (wherein $0 \leq x \leq 1$, $0 \leq y \leq 1$, $0 \leq x+y \leq 1$, and M is a metal such as Al, Sr, Mg, La, etc.); and lithium chalcogenide compounds that are capable of reversible intercalation/deintercalation of the lithium ions. In addition, it preferably includes TiS, MoS, organic sulfide compounds, or organic polysulfide compounds, which are capable of reversible intercalation/deintercalation of lithium ions.

The negative active material includes amorphous or crystalline carbon, graphitized carbon fiber, graphitized mesocarbon microbeads, a carbon-containing composite, lithium metal, or a lithium-containing alloy. The exemplary lithium-containing alloy includes an alloy of lithium with Al, Si, Sn, Pb, Zn, Bi, In, Mg, Ga, or Cd.

A slurry comprising the active materials is prepared for preparation of a positive electrode and a negative electrode, and then the electrolyte of the present invention is injected between the positive and negative electrodes in order to fabricate a lithium secondary battery cell.

When an electrolyte of the present invention is an organic electrolyte solution, a separator is interposed between the positive and negative electrodes and the organic electrolyte solution is injected between them. The separator may include a porous resin film such as polyethylene or polypropylene. When an electrolyte of the present invention is a polymer electrolyte, a separator is not needed.

A first charging and a second charging are performed with respect to the fabricated lithium secondary battery cell. During the first charging process, an organic SEI film is formed on a surface of the negative electrode of the battery cell according to the present invention.

When a lithium metal is used as a counter electrode, the first charging process is preferably performed by charging the battery at constant current so that the potential of the negative electrode reaches a voltage in the range of 0.8 to 1.3V, and then by further charging it at constant voltage for 0.1 to 8 hours while maintaining the voltage of the negative electrode. The current density preferably ranges from 0.01 to 0.3 C during the constant-current charging.

Before occurrence of decomposition of the electrolyte, an organic SEI film is formed on a surface of the negative electrode by anionic polymerization of the compound represented by Formula (1), or the acrylate-based polymer, during the first charging process.

When a lithium metal is used for a counter electrode, the compound represented by Formula (1) and the acrylate-based polymer are copolymerized through anionic addition polymerization when the potential of the negative electrode ranges from 0.8 to 1.3V. When the potential of the negative electrode is greater than 0.8V, the electrolyte is not decomposed, and the lowest limit of the charging voltage is preferably 0.8V. In addition, because the anionic addition polymerization is a relatively slow reaction, charging under constant voltage is preferably performed for 0.1 to 8 hours while maintaining a charging voltage to carry out the polymerization sufficiently.

It is not preferable to have the potential of the negative electrode below 0.8V, because the electrolyte may be actively decomposed. When the potential of the negative electrode is above 1.3V, the copolymerization reaction of the acrylate-based polymer and the acrylonitrile may be not initiated.

When the charging time at a constant voltage is below 0.1 hour, the compound represented by Formula (1) and the acrylate-based polymer may be insufficiently reacted together, and the organic SEI film may have faults. When the charging time at a constant voltage is over 8 hours, the copolymerization reaction is virtually completed, so the charging is not needed.

Alternatively, when a lithium metal composite oxide is used for a positive electrode, in the first charging process, it is preferable that charging is performed for 0.1 to 8 hours at a constant voltage while maintaining the voltage, after charging a battery at a constant current so that battery voltage reaches the voltage ranging from 2.5 to 3.1V.

When the organic SEI film is formed on the surface of the negative electrode, the concentration of non-reactants, the compound represented by Formula (1) and the acrylate-based polymer, decreases conspicuously. Therefore, the rest of the monomers do not affect the battery performance, and the battery performance is not deteriorated by the remaining monomers.

Subsequently, when a lithium metal is used for a counter electrode, in the second charging process, it is preferable that charging is performed for 1 to 8 hours at a constant voltage while maintaining the voltage, after charging a battery at a constant current so that the potential of the negative electrode reaches a voltage ranging from 0 to 0.1V. During the constant current charging, the current density preferably ranges from 0.1 to 0.5 C.

In the second charging process, the organic SEI film has already formed on the negative electrode during the first charging process, the electrolyte and the negative electrode do not contact each other, and the electrolyte is prevented from decomposing.

When the voltage of the negative electrode at a constant current is above 0.1V, the battery capacity may be insufficient. When the voltage of the negative electrode at constant current is below 0V, the crystalline structure of the positive active material may be destroyed.

When the charging time at a constant voltage is less than 1 hour, the battery may be insufficiently charged. When the charging time at a constant voltage is greater than 8 hours, the battery may be overcharged, and the negative electrode may be deteriorated.

When a lithium metal composite oxide is used for a positive electrode, in the second charging process, it is preferable that charging is performed for 1 to 8 hours at a constant voltage while maintaining the voltage after charging the battery at a constant current so that battery voltage reaches a voltage ranging from 4.0 to 4.3V.

The battery is preferably allowed to stand for 1 to 8 hours between the first charging process and the second charging process because the copolymerization of the materials can thereby be carried out sufficiently when the first charging time is not sufficient.

In the present invention, the fabricated battery may be heat-treated before the first charging process and the added compounds may be adsorbed to a surface of the negative electrode. During the heat-treatment, acrylate-based polymers added to the electrolyte of the second preferred embodiment and the third preferred embodiment form a polymer through radical-polymerization, and an organic electrolyte solution is impregnated in the formed polymers to form an electrolyte. In addition, the compound represented by Formula (1) and the acrylate-based polymer are adsorbed to the surface of the negative electrode during the heat-treatment process, and are polymerized at this time to form an organic SEI film by the subsequent first charging process. Therefore, the organic SEI film is formed on the surface of the negative electrode before the electrolyte is decomposed. Since it takes a long time to perform the charging at a constant current during the first charging process, the copolymerization reaction of the compound represented by Formula (1) and the acrylate-based polymer is preformed sufficiently, and the yield of the organic SEI film increases.

The heat-treatment is preferably performed at a temperature ranging from 40 to 120° C. When the heat-treatment temperature is below 40° C., the radical-polymerization of the acrylate-based polymer may occur insufficiently. When the heat-treatment temperature is over 120° C., the electrolyte may be modified, and the battery performance comprising it may deteriorate.

The organic SEI film prevents an electrolyte from decomposing during the second charging process, and it also prevents gas generation in a battery and modification of electrolyte The following Examples further illustrate the present invention in detail but are not to be construed to limit the scope thereof.

EXAMPLES AND COMPARATIVE EXAMPLES

Example 1

Ethylene carbonate/dimethyl carbonate (EC/DMC) was mixed in a volume ratio of 1:1 in order to prepare a non-aqueous organic solution. 1M $LiPF_6$ was added to the solution, and 0.25 wt % of acrylonitrile based on the total weight of electrolyte was further added to the solution in order to prepare an electrolyte.

Example 2

An electrolyte was prepared in the same manner as in Example 1, except that 0.5 wt % of acrylonitrile based on the total weight of electrolyte was added to the solution instead of 0.25 wt % of acrylonitrile.

Example 3

An electrolyte was prepared in the same manner as in Example 1, except that 1.0 wt % of acrylonitrile based on the total weight of electrolyte was added to the solution instead of 0.25 wt % of acrylonitrile.

Example 4

An electrolyte was prepared in the same manner as in Example 1, except that 0.5 wt % of methacrylonitrile based on the total weight of electrolyte was added to the solution instead of 0.25 wt % of acrylonitrile.

Example 5

An electrolyte was prepared in the same manner as in Example 1, except that 0.5 wt % of pentenenitrile based on the total weight of electrolyte was added to the solution instead of 0.25 wt % of acrylonitrile.

Example 6

Anionic copolymerization was performed by the present invention

Comparative Example 1

An electrolyte was prepared in the same manner as in Example 1, except that acrylonitrile was not added to the solution.

Comparative Example 2

An electrolyte was prepared in the same manner as in Example 1, except that 5.0 wt % of acrylonitrile based on the total weight of electrolyte was added to the solution instead of 0.25 wt % of acrylonitrile.

Measurement of Decomposition Voltage

Decomposition voltage of the electrolytes according to Example 3 and Comparative Example 1 were measured by cyclic voltametry. The decomposition voltages are represented in Table 1.

TABLE 1

|  | Decomposition voltage (V) |
|---|---|
| Example 3 | 0.95 |
| Comparative Example 1 | 0.5 |

The conditions for measurement of the decomposition voltages were as follows:
working electrode: mesocarbon fiber (MCF); reference electrode: Li-metal; counter electrode: Li-metal; voltage range: 3V to 0V; scan rate: 0.1 mV/s.

The electrolyte of Example 3 to which acrylonitrile was added has a decomposition voltage higher than that of the electrolyte of Comparative Example 1 to which acrylonitrile was not added. Accordingly, the electrolyte of Example 3 decomposes earlier during initial charging, and an SEI film is formed on the negative electrode at the decomposition voltage. The electrolytes of Examples 4 and 5 to which methacrylonitrile and pentenenitrile were respectively added have higher decomposition voltages than the electrolyte of Comparative Example 1 to which the compounds are not added. The SEI film prevents an electrolytic organic solvent from decomposing, thereby inhibiting gas generation inside the cell. Therefore, the internal pressure of a cell decreases, and the increased thickness of a cell after full charging can be decreased.

Fabrication of Lithium Ion Battery Cells

After $LiCoO_2$ as a positive active material, polyvinylidenefluoride (PVdF) as a binder, and acetylene black as a conductive agent were mixed in a weight ratio of 92:4:4, a positive slurry was prepared by dispersing the mixture into N-methyl-2-pyrrolidone (NMP). The slurry was coated on a 20 µm thick aluminum foil, dried, and compressed, thereby manufacturing a positive electrode. After mixing crystalline artificial graphite as a negative active material with PVdF as a binder in a weight ratio of 92:8, a negative slurry was prepared by dispersing the mixture in NMP. The slurry was coated on a 15 µm thick copper foil, dried, and compressed, thereby manufacturing a negative electrode. Together with a 25 µm thick polyethylene separator, the manufactured electrodes were wound and pressed, then placed into prismatic cans having the dimensions of 30 mm×48 mm×6 mm. Each electrolyte of Examples 1 to 5 and Comparative Examples 1 and 2 were injected into the cans, thereby completing the fabrication of the lithium ion battery cells.

Thickness Variations in the Lithium Ion Battery Cells after Charging

The lithium ion battery cells, which were fabricated by injecting the electrolyte solutions of Examples 1 to 5 and Comparative Examples 1 and 2, were charged with a current of 160 mA to a voltage of 4.2V under constant current and constant voltage (CC-CV), then they were allowed to sit for 1 hour. The lithium ion battery cells were discharged to 2.5V with a current of 170 mA, and left to sit for 1 hour. After 3 charge/discharge cycles were performed, the battery cells were charged with a current of 425 mA to a charge voltage of 4.2V for 2 hours and 30 minutes. The rates of increase in the thickness of the cells after charging (relative to the thickness measured after fabrication of the cells) were measured. The results are represented in Table 2.

TABLE 2

|  | Thickness variation of cells after charging |
|---|---|
| Example 1 | 8.5% |
| Example 2 | 7.5% |
| Example 3 | 6.5% |
| Comparative Example 1 | 9.1% |

Thickness Variations of the Cells during High Temperature Storage after Charging The prismatic lithium ion battery cells including the electrolytes according to Examples 1 to 5 and Comparative Examples 1 and 2 were manufactured. They were placed in a chamber of high temperature (85° C.) for 4 days. The thickness of each cell after charging was measured every 24 hours in order to find the increase rates of the thicknesses of the cells (relative to the thickness measured after cell fabrication). The results of Examples 1 to 3 and Comparative Example 1 are represented in Table 3.

TABLE 3

|  | 4 hours after allowing the cells to stand | 24 hours after allowing the cells to stand | 48 hours after allowing the cells to stand | 96 hours after allowing the cells to stand |
| --- | --- | --- | --- | --- |
| Example 1 | 14.5% | 19.3% | 22.5% | 32.8% |
| Example 2 | 12.3% | 17.5% | 20.6% | 31.5% |
| Example 3 | 11.9% | 17.7% | 20.2% | 30.3% |
| Comparative Example 1 | 14.7% | 20.0% | 23.2% | 36.8% |

It is evident from Tables 3 and 4 that the increases in thickness of the lithium ion cells into which the electrolytes of Examples 1 to 3 were injected were substantially less than that of the lithium ion cell into which the electrolyte solution of Comparative Example 1 was injected.

Test for Cycle Life Characteristics

The lithium ion battery cells, which were manufactured with the electrolyte solutions of Examples 1 to 5 and Comparative Examples 1 and 2, were charged with a current of 800 mA to a charge voltage of 4.2V under CC-CV for 2 hours 30 minutes, and the cells were discharged with a current of 800 mA to a cut-off voltage under CC at 1 C to 2.75V. 300 cycles of charge and discharge of the cells comprising electrolytes according to Examples 1 to 5 and Comparative Examples 1 and 2 were performed, and the cycle life characteristics of the cells according to Examples 1 to 5 and Comparative Examples 1 and 2 were measured. The results pertaining to Examples 1 to 3 and Comparative Example 1 and 2 are shown in FIG. 1.

The capacity of the cell of Comparative Example 1 decreased significantly during the charge and discharge cycles, but those of Examples 1 to 3 did not decrease nearly as much. The initial capacity of the cell of Comparative Example 2 was not good. Accordingly, the cycle life characteristics of the cells of Examples 1 to 3 are better than those of Comparative Examples 1 and 2.

The thickness variation of the cells according to Examples 4 and 5 during and after full-charging, after charging, and during storage of cells is far less than that according to Comparative Example 1. The cycle life characteristics of the cells according to Examples 4 and 5 are excellent, like those of cells according to Examples 1 to 3.

The acrylonitrile, which is added to the electrolyte of the present invention, is decomposed earlier than an electrolytic organic solvent during initial charging. Thus, an SEI film is formed on a negative electrode, and the SEI film inhibits an electrolytic organic solvent from being decomposed. Therefore, a lithium secondary battery cell to which the electrolyte of the present invention is applied decreases the internal pressure of the cell and prevents the thickness of the cell from increasing during charging at room temperature or during high temperature storage after charging. That is, these effects are realized by inhibiting the generation of gas caused by the decomposition of the electrolytic organic solvent during initial charging.

Fabrication of a Lithium Secondary Battery Cell According to Example 6

4.95 wt % of PEGDMA having an average molecular weight of 550, 0.5 wt % of acrylonitrile (AN), 0.05 wt % of azoisobutyronitrile (AIBN) for an initiator and 94.5 wt % of an organic electrolyte solution were mixed together for 30 minutes in order to prepare an electrolyte precursor. For the organic electrolyte solution, a mixed solvent of ethylene carbonate (EC) and dimethylcarbonate (DEC) in a volume ratio of 3 to 7 including 1 M $LiPF_6$ dissolved therein was used.

After inserting a positive electrode including $LiCoO_2$ as a positive active material and a negative electrode including a carbon fiber as a negative active material into a can, the electrolyte was injected, and the can was sealed to fabricate a prismatic battery cell having the dimensions of 30 mm×60 mm×4 mm.

The prismatic battery cell was heat-treated for 5 hours at 70° C., and PEGDMA was radical-polymerized in order to prepare an electrolyte comprising the PEGDMA polymer and the organic electrolyte solution. The heat-treated battery cell was charged at 0.2 C at a constant current until reaching 3V (potential of a negative electrode relative to that of a lithium metal is 0.8V), and it was further charged for 4 hours at a constant voltage (the first charging process). The AN and PEGDMA were polymerized during the first charging process, and an organic SEI film was formed on the surface of the negative electrode. Then, the battery cell was charged at 0.2 C at constant current until reaching 4.2V (potential of a negative electrode relative to that of a lithium metal is 0.1V), and it was further charged for 9 hours at a constant voltage (the second charging process), thereby fabricating a lithium secondary battery cell of Example 6.

Example 7

A lithium secondary battery cell was fabricated in the same manner as in Example 6, except that the gas inside the battery cell was vented after the second charging process.

Example 8

A lithium secondary battery cell was fabricated in the same manner as in Example 6, except that 0.2 wt % of acrylonitrile (AN) and 94.8 wt % of an organic electrolyte solution were used.

Example 9

A lithium secondary battery cell was fabricated in the same manner as in Example 6, except that 0.2 wt % of acrylonitrile (AN), 1 wt % of acetonitrile (ACN), 0.05 wt % of AIBN initiator, and 93.8 wt % of an organic electrolyte were mixed together for 30 minutes in order to prepare an electrolyte precursor. The ionic conductivity of the electrolyte was not changed when ACN below 5 wt % was added to the organic electrolyte solution.

Fabrication of a Lithium Secondary Battery Cell According to Comparative Example 3

A lithium secondary battery cell was fabricated in the same manner as in Example 6, except that 4.95 wt % of PEGDMA having an average molecular weight of 550, 0.05 wt % of AIBN initiator and 95 wt % of an organic electrolyte solution were mixed together for 30 minutes in order to prepare an electrolyte precursor.

The lithium secondary battery cell was heat-treated for 5 hours at 70° C. in order to radical-polymerize the PEGDMA, thereby preparing an electrolyte comprising a PEGDMA polymer and the organic electrolyte solution. The heat-treated battery cell was charged at 0.2 C at a constant current until reaching 4.2V (potential of a negative electrode relative to that of a lithium metal is 0.1V), and it was further charged for 9 hours at 4.2V at a constant voltage (the second charging process). The gas inside the battery cell was vented after the second charging process, thereby fabricating a lithium secondary battery cell of Comparative Example 3.

Comparative Example 4

A lithium secondary battery cell was fabricated in the same manner as in Comparative Example 3, except that the gas inside the battery cell was not vented after the second charging process.

Comparative Example 5

The lithium secondary battery cell fabricated in Comparative Example 3 was charged at 0.2 C at a constant current until reaching 3V (potential of a negative electrode relative to that of a lithium metal is 0.8V), and it was heat-treated for 4 hours at 75° C. The heat-treated battery cell was further charged at 0.2 C at a constant current until reaching 4.2V (potential of a negative electrode relative to that of a lithium metal is 0.1V), and charged for 9 hours at a constant voltage, thereby fabricating a lithium secondary battery cell of Comparative Example 5.

Fabrication of a Lithium Secondary Battery Cell of Comparative Example 6

A lithium secondary battery cell was fabricated in the same manner as in Example 6, except AN, PEGDMA, and AIBN were not used. The battery cell was charged at 0.2 C at a constant current until reaching 3V (potential of a negative electrode relative of that of a lithium metal is 0.8V), and it was heat-treated for 4 hours at 75° C. The heat-treated batter was further charged at 0.2 C at 0.2 C at constant voltage until reaching 4.2V (potential of a negative electrode relative to that of a lithium metal is 0.1V), and charged for 9 hours at a constant voltage, thereby fabricating a lithium secondary battery cell of Comparative Example 6.

The thickness, internal impedance, and discharge capacity after the battery cells were allowed to stand for 24 hours at 85° C., retention capacity and recovery capacity of battery cells according to Examples 6 and 7 and Comparative Examples 3 to 5 were respectively measured. The results are shown in Table 4.

TABLE 4

|  | Thickness (mm) | Internal impedance (mΩ) | Discharge Capacity (mAh) | Retention Capacity (mAh) after discharging at 85° C. | Recovery capacity (mAh) after discharging at 85° C. |
| --- | --- | --- | --- | --- | --- |
| Example 6 | 3.85 | 65.7 | 618 | 356 | 468 |
| Example 7 | 3.82 | 59.3 | 633 | 366 | 471 |
| Comparative Example 3 | 3.85 | 61.1 | 635 | 355 | 410 |
| Comparative Example 4 | 3.97 | 59 | 593 | 224 | 294 |
| Comparative Example 5 | 3.91 | 72.3 | 602 | 253 | 388 |

Figure 2:
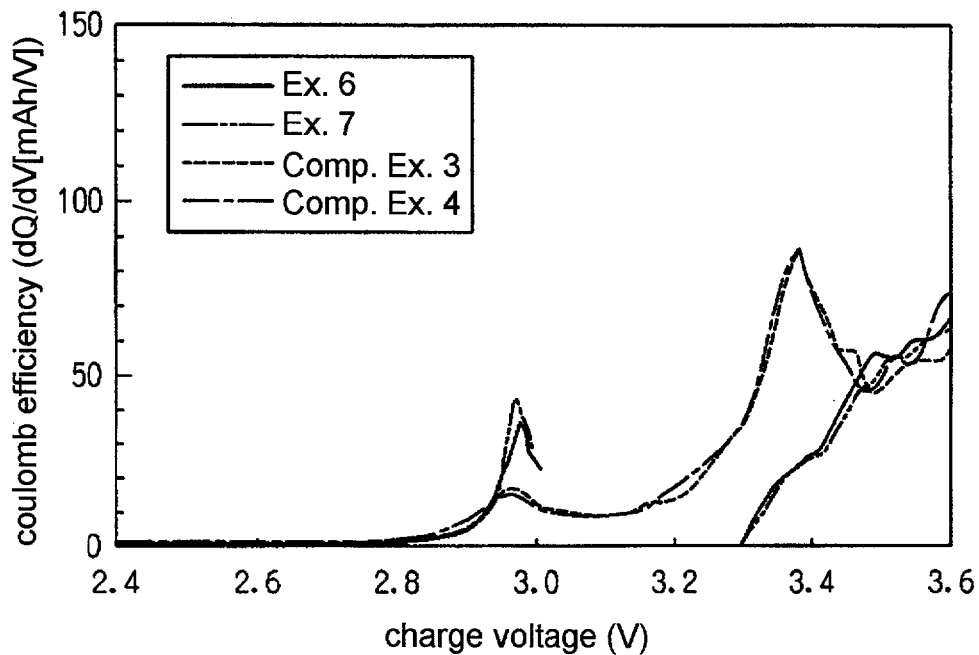
FIG. 2 is a graph illustrating coulomb efficiency of the battery cells including electrolytes according to Examples 6 and 7, and Comparative Examples 3 and 4 relative to a charge voltage.
Figure 3:
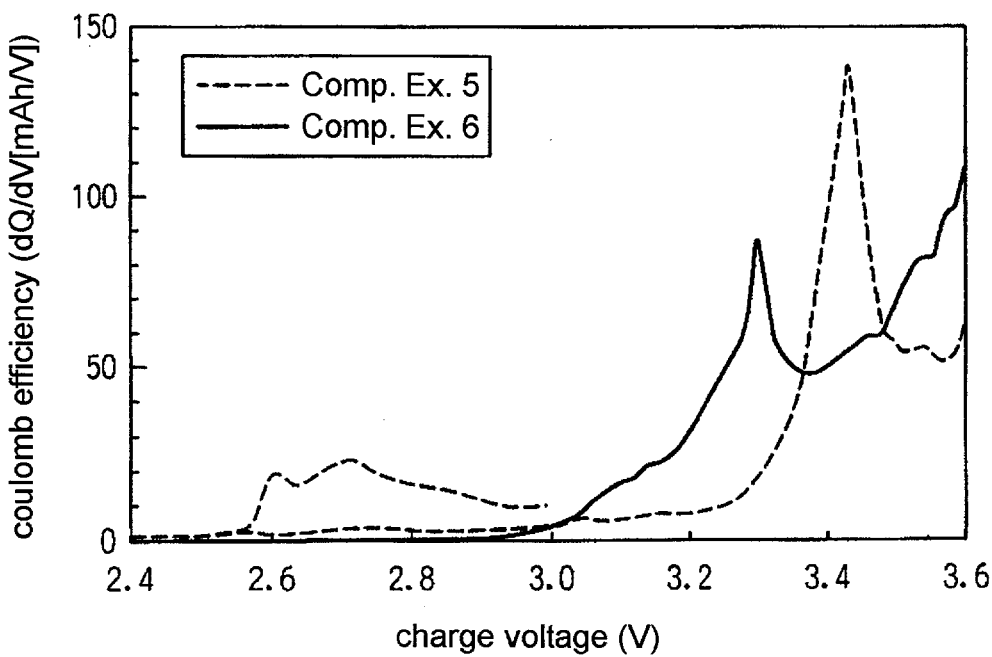
FIG. 3 is a graph illustrating coulomb efficiency of the battery cells including electrolytes according to Comparative Examples 5 and 6 relative to a charge voltage.

FIGS. 2 and 3 shows coulomb efficiency of the battery cells according to Examples 6 and 7 and Comparative Examples 3 to 6 relative to a charging voltage during the second charging process.

The cycle life characteristics of the battery cells according to Examples 6 and 7 and Comparative Examples 3 and 4 were measured at 1 C, 4.2V of cut-off charging voltage, and 2.5V of cut-off discharging voltage. The results are presented in FIG. 4.

In addition, discharge capacity of the battery cells according to Examples 8 and 9, and Comparative Example 3 were respectively measured at −20° C. and at room temperature. The results were represented in Table 5.

TABLE 5

|  | Discharge capacity at −20° C. (mAh) | Discharge capacity at room temperature (mAh) | The ratio of the discharge capacity at −20° C. to that at room temperature (%) |
| --- | --- | --- | --- |
| Example 8 | 226 | 605 | 37 |
| Example 9 | 370 | 608 | 61 |
| Comparative Example 3 | 192 | 635 | 30 |

As shown in FIG. 2, the relatively small peaks of Examples 6 and 7 appear at 2.9 to 3.0V during the first charging process, and the peaks correspond to the polymerization reaction of AN and PEGDMA.

In addition, since the coulomb efficiency increases as the charging voltages gradually increases, it is concluded that the electrolytes of Examples 6 and 7 are prevented from decomposing.

On the other hand, as shown in FIGS. 2 and 3, the relatively large peaks of Comparative Examples 3 to 6 appear at 3.2 to 3.5V. It is concluded that the electrolytes of Comparative Examples 3 to 6 are decomposed.

Therefore, it is concluded that the prevention from decomposition of electrolytes according to Examples 6 and 7 results from formation of an organic SEI film on the surface of the negative electrode during the first charging process.

The thickness of the battery cells evidences the formation of an organic SEI film. As shown in Table 4, the thickness of the battery cell where the gas inside the cell was not vented according to Example 6 is thinner than that of the battery cell where the gas inside the cell was not vented according to Comparative Example 4, and almost the same as that of the battery cell where the gas inside the cell was vented according to Comparative Example 3. Therefore, an organic SEI film was formed on the surface of the negative electrode of Example 6 by addition of AN and PEGDMA, and the organic SEI film prevented the electrolyte from decomposing, thereby decreasing the gas generation.

In addition, the thickness of the battery cell according to Comparative Example 5 increased although AN and PEGDMA were added. The cause is believed to be that much gas was generated due to decomposition of the electrolyte since the heat-treatment was performed during the charging process.

There were little differences in the internal impedances of battery cells according to Examples 6 and 7, compared to those of Comparative Examples 3 and 4. Therefore, the internal impedance does not increase due to formation of an organic SEI film.

The retention capacities of the battery cells according to Examples 6 and 7 after the battery cells were allowed to stand for 24 hours at 85° C. were higher than those according to Comparative Examples 3 to 5. Also, the recovery capacities of the battery cells according to Examples 6 and 7 were higher than those according to Comparative Examples 3 to 5. These results indicate that the organic SEI film improves storage characteristics at high temperature due to inhibition of decomposition of electrolyte.

Figure 4:
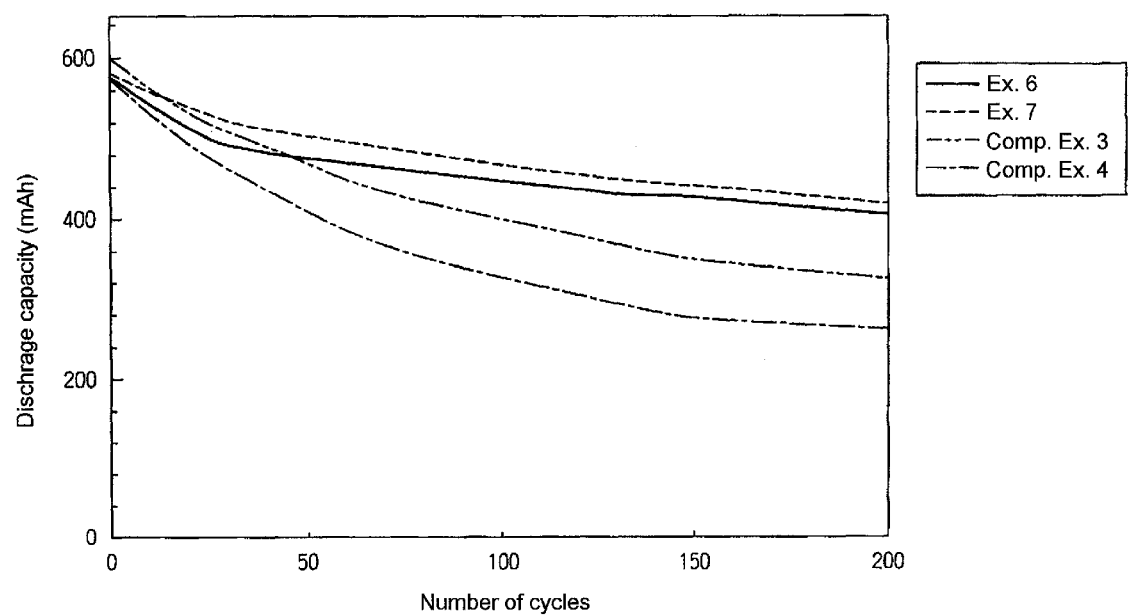
FIG. 4 is a graph illustrating cycle life characteristics of the battery cells including electrolytes according to Examples 6 and 7, and Comparative Examples 3 and 4.

As shown in FIG. 4, the cycle lives of the battery cells according to Examples 6 and 7 were almost the same as those according to Comparative Examples 3 to 5 at the initial cycle. But the cycle lives of Examples 6 and 7 started to be better than those of Comparative Examples 3 to 5 after 50 cycles, and the cycle lives of Examples 6 and 7 were much better than those according to Comparative Examples 3 to 5 at approximately 200 cycles.

It is believed that the cycle lives of battery cells according to Examples 6 and 7 are enhanced due to prevention of electrolyte decomposition and modification resulting from formation of an organic SEI film. On the other hand, it is believed that the cycle lives of battery cells according to Comparative Examples 3 to 5 deteriorate due to direct contact of the electrolyte and the negative electrode, resulting in modification of the electrolyte and a decrease in charge-discharge efficiency.

As shown in Table 5, the discharge capacities of battery cells according to Examples 8 and 9 at −20° C. were higher than those of the battery cell according to Comparative Example 3. In particular, the discharge capacity of a battery cell according to Example 8 where ACN was added greatly increased at −20° C. Therefore, the ACN affects an increase of performance at low temperatures.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. A lithium secondary battery comprising: a negative electrode comprising a material selected from the group consisting of carbon, carbon composites, lithium metal, and lithium alloys; a positive electrode comprising a material selected from the group consisting of lithium chalcogenides, lithium transition metal oxides, TiS, MoS, organic sulfides, and organic polysulfides; and a non-aqueous liquid electrolyte comprising:
a lithium salt;
an organic solvent; and
a compound represented by Formula (1), wherein the content of the compound ranges from 0.1 to 1 wt %, based on a total weight of the electrolyte:

wherein $R_1$, $R_2$, and $R_3$ are each independently selected from the group consisting of hydrogen, primary, secondary, and tertiary alkyl groups, alkenyl groups, and aryl groups and wherein the compound forms a film on the negative electrode at initial charging of the battery.

2. The lithium secondary battery according to claim 1, wherein the lithium salt is at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ where x and y are natural numbers, LiCl, and LiI.

3. The lithium secondary battery according to claim 1, wherein the organic solvent is at least one selected from the group consisting of cyclic carbonates, chain carbonates, and mixtures thereof.

4. The lithium secondary battery according to claim 3, wherein the electrolyte comprises a cyclic carbonate and a chain carbonate mixed in a volume ratio of 1:1 to 1:9.

5. The lithium secondary battery according to claim 3, wherein the electrolyte comprises at least one cyclic carbonate selected from the group consisting of ethylene carbonate (EC), propylene carbonate (PC), butylene carbonate (BC), and mixtures thereof.

6. The lithium secondary battery according to claim 3, wherein the electrolyte comprises at least one chain carbonate selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), and mixtures thereof.

7. The lithium secondary battery according to claim 1, wherein the compound represented by Formula (1) is at least one selected from the group consisting of acrylonitrile, methacrylonitrile, pentenenitrile, 2-ethylpentenenitrile, 2-methylpentenenitrile, and mixtures thereof.

8. A non-aqueous electrolyte for a lithium secondary battery comprising:
a lithium salt;
an organic solvent comprising a mixed solvent of a carbonate-based solvent and an aromatic hydrocarbon solvent; and
a compound represented by Formula (1), wherein the content of the compound ranges from 0.1 to 1 wt % based on a total weight of the electrolyte:

wherein $R_1$, $R_2$, and $R_3$ are each independently selected from the group consisting of hydrogen, primary, secondary, and tertiary alkyl groups, alkenyl groups, and aryl groups.

9. The electrolyte for a lithium secondary battery according to claim 8, wherein the aromatic hydrocarbon solvent is at least one selected from the group consisting of benzene, fluorobenzene, toluene, trifluorotoluene, xylene, and mixtures thereof.

10. The electrolyte for a lithium secondary battery according to claim 8, wherein the carbonate-based solvent and the aromatic hydrocarbon solvent are mixed in a volume ratio of 1:1 to 10:1.

11. A method of preparing a lithium secondary battery comprising:
  providing a positive electrode comprising a material selected from the group consisting of lithium chalcogenides, lithium transition metal oxides, TiS, MoS, organic sulfides, and organic polysulfides;
  providing a negative electrode comprising a material selected from the group consisting of carbon, carbon composites, lithium metal, and lithium alloys;
  interposing a liquid electrolyte comprising a lithium salt, an organic solvent, and an additive comprising a compound represented by Formula (1) between the positive electrode and the negative electrode to fabricate the battery:

(1)

wherein $R_1$, $R_2$, and $R_3$ are each independently selected from the group consisting of hydrogen, primary, secondary, and tertiary alkyl groups, alkenyl groups, and aryl groups and the content of the compound in the electrolyte ranges from 0.1 to 1 wt %; and
  forming a film with the additive on the negative electrode.

* * * * *